US006191380B1

(12) United States Patent
Thomas

(10) Patent No.: US 6,191,380 B1
(45) Date of Patent: Feb. 20, 2001

(54) PLASMA ARC TORCH HEAD

(76) Inventor: Hughen Gerrard Thomas, EL-55, M.I.D.C., Bhosari, Pune 411 026, Maharashtra (IN)

( * ) Notice: Under 35 U.S.C. 154(b), the term of this patent shall be extended for 0 days.

(21) Appl. No.: 09/593,414

(22) Filed: Jun. 14, 2000

(30) Foreign Application Priority Data

Jun. 16, 1999 (IN) .......................................... 451/BOM/99
Jun. 16, 1999 (IN) .......................................... 452/BOM/99

(51) Int. Cl.[7] .................................................. B23K 26/00
(52) U.S. Cl. ................................ 219/121.48; 219/121.5; 219/121.51; 219/75; 313/231.51
(58) Field of Search ........................... 219/121.48, 121.5, 219/121.52, 121.51, 74, 75, 121.39; 313/231.31, 231.41, 231.51; 315/111.21

(56) References Cited

U.S. PATENT DOCUMENTS 4,013,866 3/1977 Fox et al. .
4,816,637 3/1989 Sanders et al. .
5,214,263 * 5/1993 Sakuragi ........................... 219/121.5
5,304,770 4/1994 Takabayashi .
5,317,126 * 5/1994 Couch, Jr. et al. ............. 219/121.51
5,349,154 9/1994 Harker et al. .
5,393,952 2/1995 Yamaguchi et al. .
5,420,391 5/1995 Delcea .
5,591,356 1/1997 Sakuragi et al. .
5,736,708 4/1998 Delzenne .
5,866,870 2/1999 Walduck .
5,893,985 4/1999 Luo et al. .
5,897,059 4/1999 Muller .
5,906,757 5/1999 Kong et al. .

* cited by examiner

*Primary Examiner*—Mark Paschall
(74) *Attorney, Agent, or Firm*—Bierman, Muserlian and Lucas

(57) ABSTRACT

A method of centering an electrode in the nozzle of a plasma arc torch head is disclosed. The method involves complementing the external wall of the swirl to the internal taper of the nozzle; complementing the internal wall of the swirl to the external taper of the electrode; fitting the hollow tapered swirl so formed in the hollow nozzle to abut the inner taper of the nozzle; and fitting the electrode in the hollow swirl to abut the inner taper of the swirl to center the electrode within the nozzle. Also disclosed is a head for a plasma arc cutting torch which includes a a swirl located between the nozzle and the electrode, through which plasma fuel gas is introduced into the nozzle, characterized in that the plasma fuel gas is introduced directly into the plasma formation zone or plenum beyond the junction between the nozzle body and cone end thereby avoiding change in direction within the conical end of the nozzle before the plasma formation zone.

5 Claims, 5 Drawing Sheets

PLASMA ARC TORCH HEAD

FIELD OF THE INVENTION

This invention relates to plasma arc torches, which sever metal by using a constricted arc of ionized gas in the form of plasma to melt a desired area on a work piece and remove molten material with a high velocity jet of gas. Particularly, this invention relates to an improved head for plasma arc torches, typically liquid cooled plasma arc torches and a method of centering an electrode in the nozzle of a plasma arc torch head.

BACKGROUND OF THE INVENTION

A plasma arc torch is defined by a cylindrical torch body and a head extending from the body. The head is constituted by an electrode positioned carefully in a cone-ended nozzle behind a nozzle orifice and a nozzle throat. The cone end may be straight walled or curvaceous. The electrode and a work piece, towards which the nozzle throat is directed, are maintained at opposite electrical polarities. Ionizable pressurized gas, typically one or more, selected from oxygen, nitrogen, hydrogen, air and argon, is constricted between the electrode and the nozzle orifice.

A power source initiates a spark between the electrode and the nozzle when the nozzle is temporarily brought in opposite polarity with the electrode. The head is then positioned towards a work piece. High-pressure gas is led into a zone between the operative front end face of the electrode, bearing an emissive insert, and the nozzle orifice. This is the plasma formation zone or the plenum. The spark ionizes a portion of the gas in this zone to, at first, enable a pilot low current arc to be formed between the emissive insert and the nozzle. The nozzle is then disconnected from the power circuit and the work piece is brought into circuit and a sustained high velocity high current plasma arc column is projected through the nozzle orifice and focussed by the nozzle throat on a selected location on the work piece. The arc melts and cuts the work piece. The accurate formation of the plasma cutting arc is dependant among other factors upon proper attachment of the arc to the center of the electrode and the careful positioning of the electrode face spaced apart from the nozzle orifice.

An accurate arc attachment point on the electrode is achieved by ensuring that the plasma arc is perfectly centered for high performance cutting. This means that the plasma beam or arc column should attach to the center of the electrode front face at the emissive insert and pass through the center of the nozzle orifice and axially through the nozzle throat. This will ensure that the cut edge has as minimum a taper as possible, there is optimum cut accuracy at optimum cut speeds and the life of the consumables like the electrode and the nozzle is maintained as long as possible.

Conventional torches use diametric location as the centering method. In conventional torches, the electrode's outer diameter is located in the swirl's inner diameter and the swirl's outer diameter is located in the nozzle's inner diameter. Since these three parts have to fit into each other and there is a clearance required between them, it is inevitable that there will be a certain amount of misalignment between the electrode face and the nozzle orifice disturbing the centering to the extent of the play.

The accurate arc attachment point on the electrode is also achieved by maintaining a strong vortex of gas around the electrode. A swirl having a plurality of passages drilled there through is provided and directs gas into the annular space between the electrode and the nozzle, which spins around the electrode vortex like and eventually arrives in the plasma formation zone or plenum between the front end face of the electrode having an emissive insert and the nozzle orifice. The vortex creates an axial suction force, which forces the arc to be centered axially through the vortex train. The vortex train further focuses the arc axially through the nozzle throat. The vortex train of gas is however confronted along its path before entering the plenum with the taper of the conical end of the nozzle. This tapered region causes the gas vortex to change direction resulting in disturbance in the alignment of the vortex axis and therefore turbulence. This turbulence is directly proportional to the speed of gas flow and its pressure. This turbulence affects the centering of the arc, which in turn affects the cutting quality and cutting speed of the plasma torch.

OBJECTS OF THE INVENTION

One of the objects of this invention is to devise an improved method of centering the plasma beam or arc column to the center of the electrode front face at the emissive insert and pass through the center of the nozzle orifice and axially through the nozzle throat.

Another object of the invention is preventing the disturbance of the centered plasma beam by turbulence and hence this invention has for its object the elimination or attenuation of turbulence thereby improving cutting speed and quality.

SUMMARY OF THE INVENTION

According to one aspect of this invention, there is provided a method of centering an electrode in the nozzle of a plasma arc torch head consisting of an electrode with an operative front tapered end, a nozzle having an operative front tapered end and a swirl, comprising the steps of:

(i) complementing the external wall of the swirl to the internal taper of the nozzle;

(ii) complementing the internal wall of the swirl to the external taper of the electrode;

(iii) fitting the hollow tapered swirl so formed in the hollow nozzle to abut the inner taper of the nozzle; and (iv) fitting the electrode in the hollow swirl to abut the inner taper of the swirl to center the electrode within the nozzle yet spacing the front end surface of the electrode from the nozzle orifice.

According to another aspect of this invention there is provided a head for an improved head for a plasma arc cutting torch comprising:

(i) a cone ended peripheral nozzle, consisting of a cylindrical body with a cone end extending from the body, defining a nozzle orifice and nozzle throat;

(ii) an electrode removable fitted axially within the nozzle having an operative front end defining an end surface bearing an emissive insert;

(iii) a plasma formation zone or plenum formed between the end surface of the electrode and the nozzle orifice;

(iv) a swirl located between the nozzle and the electrode, through which plasma fuel gas is introduced into the nozzle, characterized in that the plasma fuel gas is introduced directly into the plasma formation zone or plenum beyond the junction between the nozzle body and cone end thereby avoiding change in direction within the conical end of the nozzle before the plasma formation zone.

BRIEF DESCRIPTION OF THE DRAWINGS

The invention will now be described with reference to the accompanying drawings in which.

DETAILED DESCRIPTION OF THE DRAWINGS

Figure 1:
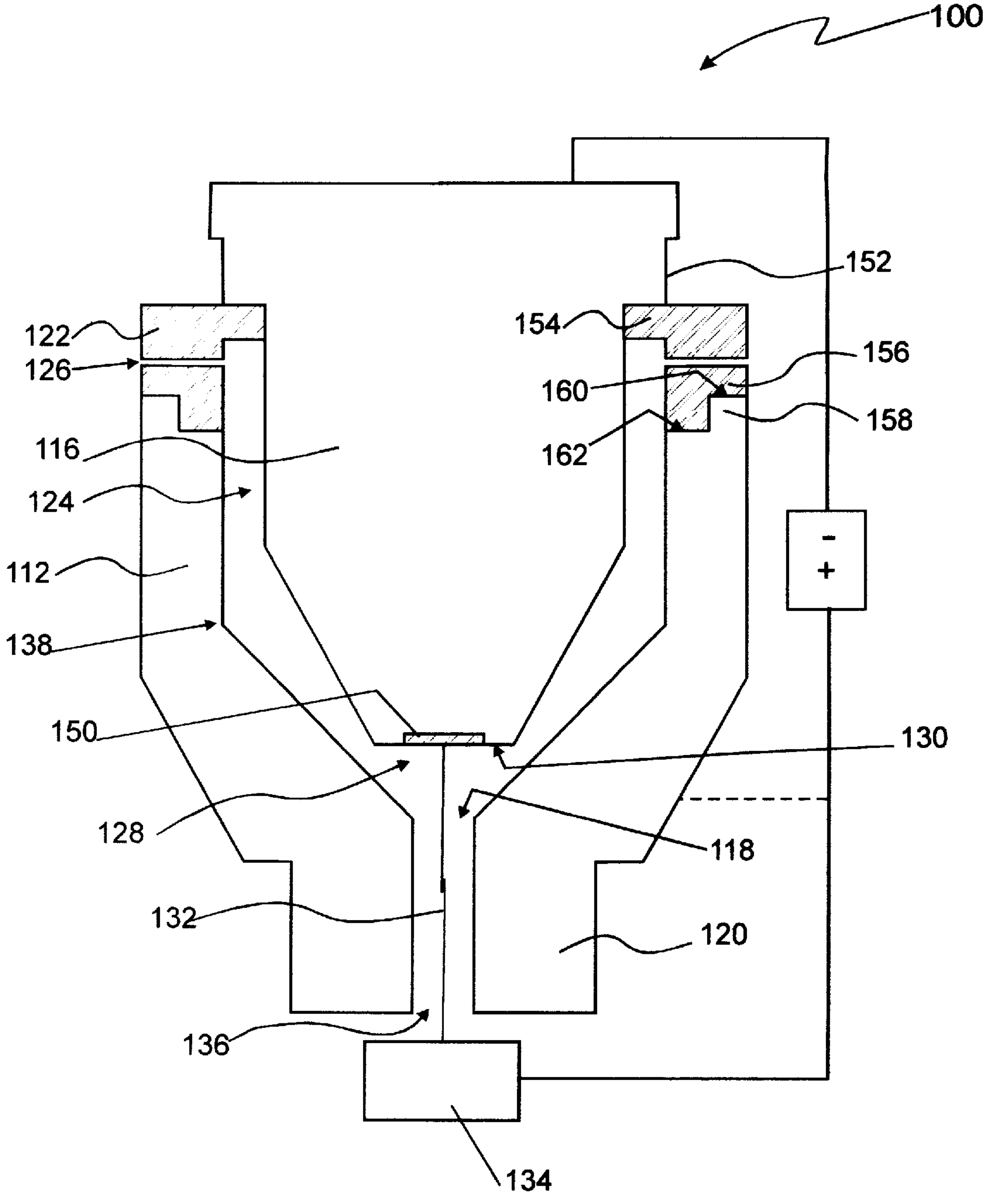
FIG. 1 is a sectional view of a plasma arc torch head of the prior art.

Referring to the drawings, a plasma arc torch head in the prior art is indicated generally by the reference numeral 100 and that in accordance with this invention by the reference numeral 200.

In the torch head 100, the nozzle 112 having a tapered conical end 114 locates an electrode 116. The nozzle 112 has a nozzle orifice 118 leading into the nozzle throat 120. The electrode 116 is positioned in the nozzle 112 with the assistance of a swirl 122 having defined plurality of passages 126 through which plasma fuel gas is introduced into the annular space 124 between the electrode 116 and the nozzle 112.

As seen in FIG. 1, the outer diameter 152 of the electrode 116 is located in the inner diameter 154 of the swirl 122 and the wall 156 of the swirl and the wall mouth 158 of the nozzle are complementarily stepped having steps 160 and 162 which match so that the diameters of the swirl 122 and the nozzle 112 cooperate with each other. This enables the swirl 122 to be centered with the nozzle 112 and the electrode 116 to be centered with the swirl 122 after the electrode 116 is fitted in the swirl 122. However, it will be appreciated that to fit the three components together a clearance will be required. This clearance which is in the region of 0.04 mm results in play causing off-centricity of the electrode face 130 with respect to the nozzle orifice 118.

Further, plasma fuel gas such as oxygen or air introduced into the annular space 124 travels towards the conical end 114. The passages 126 are typically arranged tangential to the bore of the annular space 124 so that the gas accelerates towards the conical end 114 in the form of a train of vortices. This vortex flow of the gas is very critical because on reaching the conical end 114, the vortices enter the plasma formation zone or plenum 128 which is the gap between the face 130 of the electrode 116 and the nozzle orifice 118. The vortices create an axial suction force on the plasma arc 132, which originates on the flat face 130 of the electrode 116 bearing an emissive insert 150. The vortices focus the arc through the nozzle throat 120. The centered plasma arc 132 formed axially through the ionized core of the vortices and a high velocity jet of gas surrounding the arc issuing from the nozzle throat 120 impinge on a work piece 134 positioned strategically at the leading opening 136 of the nozzle throat 120. The plasma arc 132 is sustained by maintaining the electrode 116 and the work piece 134 at opposite polarities. The arc 132 melts the location of the work piece 134 on which it strikes and the jet of gas removes the molten material. For optimum cutting quality at optimum cutting speeds, it is important that the sustained plasma arc 132 is attached on the surface 130 of the electrode 116 at its approximate center where the emissive insert is borne and the arc is focussed along the axis of the nozzle throat 120. Any turbulence to the vortices in the gas path disturbs this centering. As the gas accelerates through the annular space 124, it encounters the commencement 138 of the conical end 114 of the nozzle 112 at the junction of the cylindrical body and the conical end. At this point, the vortices change direction causing turbulence in the vortices which disturb the centering of the attachment point of the plasma arc 132 on the emissive insert 150 and also the axial displacement of the arc 132 along the nozzle throat 120. This not only disturbs cut accuracy and causes cut taper but also increases dross which coheses to the bottom edge of the cut because cutting speeds have to be lowered to compensate for the turbulence. The turbulence can also cause shorting of the arc 132 at the nozzle 112 or the nozzle throat 120 causing early erosion of the nozzle 112, erosion of the electrode body and consequently quicker replacement increasing the cost of consumables.

Figure 2:
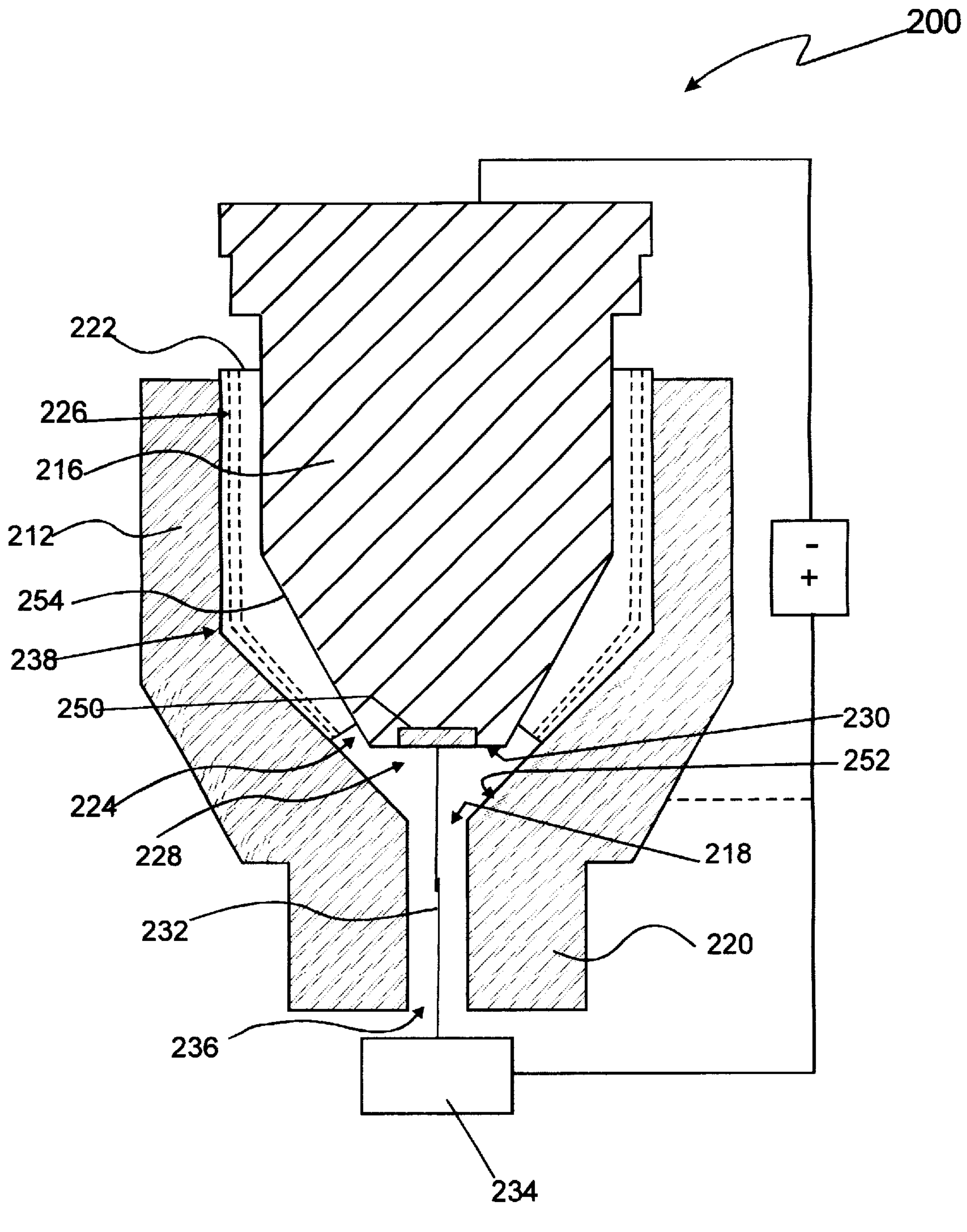
FIG. 2 is a sectional view of a plasma arc torch head in accordance with this invention.
Figure 3:
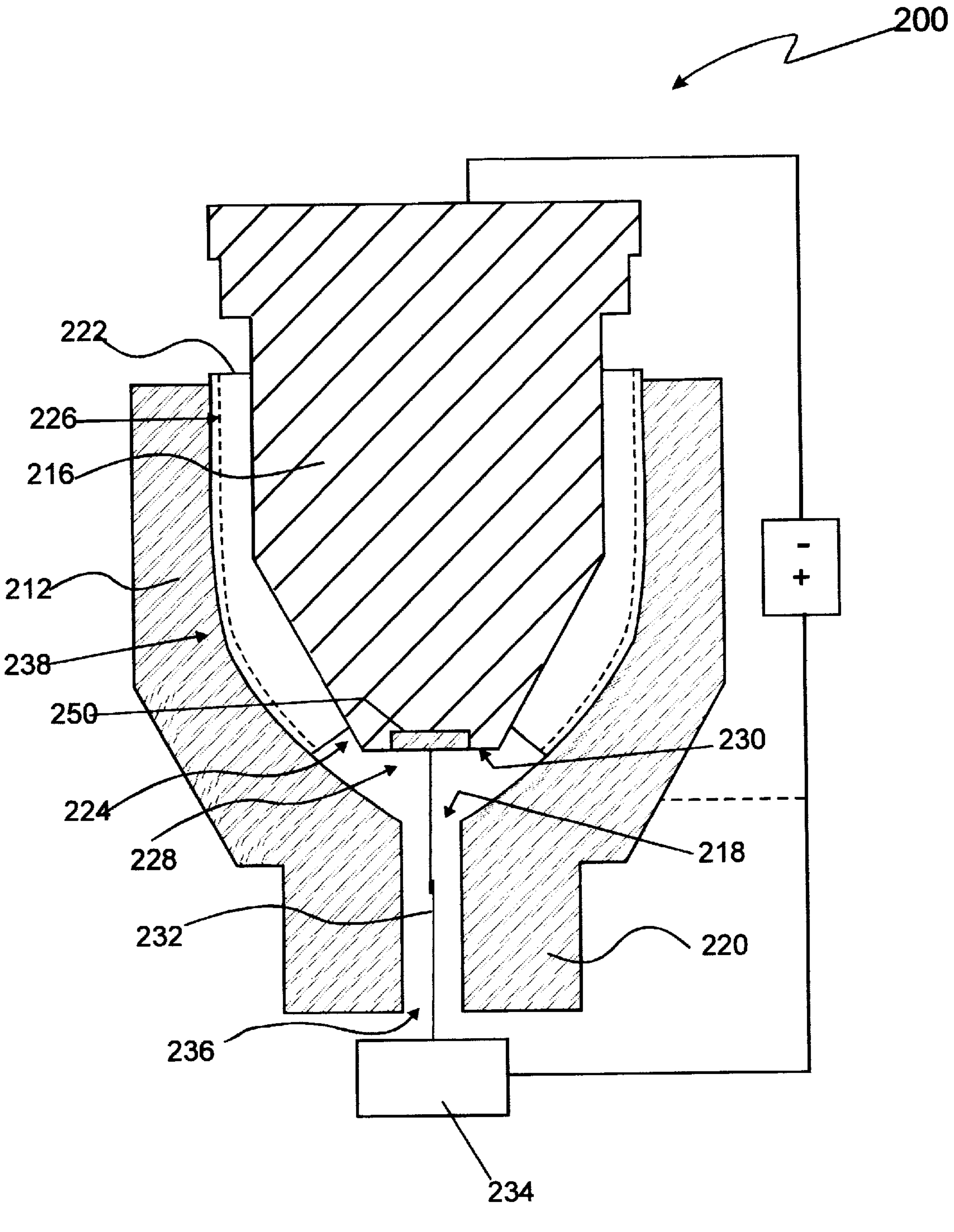
FIG. 3 is a sectional view of an alternative configuration of a plasma torch head envisaged in accordance with this invention.

Now referring to FIG. 2, the centering is achieved with the help of taper location. The internal taper 238 of the nozzle 212 is made complementary to the external taper 252 of the swirl 222 and the internal taper 254 of the swirl 222 is complementary to the external surface/taper of the electrode 216. As can be seen in FIG. 2, the three components, the nozzle 212, the swirl 222 and the electrode 216, abut each other and therefore no clearance is required.

The swirl 222 is made of a non-conducting material such as Teflon, Vespel or other suitable synthetic polymeric material that is also capable of withstanding high temperature. When the electrode 216 and work piece 234 are electrically connected with opposite polarity, a high current plasma arc 232 passes from the emissive insert 250 to the work piece 234 via the nozzle orifice 218 and the nozzle throat 220.

The taper location method in accordance with this invention exactly aligns the nozzle orifice 218 to the center of the front face 230 of the electrode. When the plasma arc 232 is struck, the centering of the electrode cannot be misaligned because the physical contact between components prevents any play ensuring attachment of the plasma arc 232 at the center of the emissive insert 250. The arc has a high degree of uniformity and the cut taper is within two degrees on both sides of the cut face.

Figure 4:
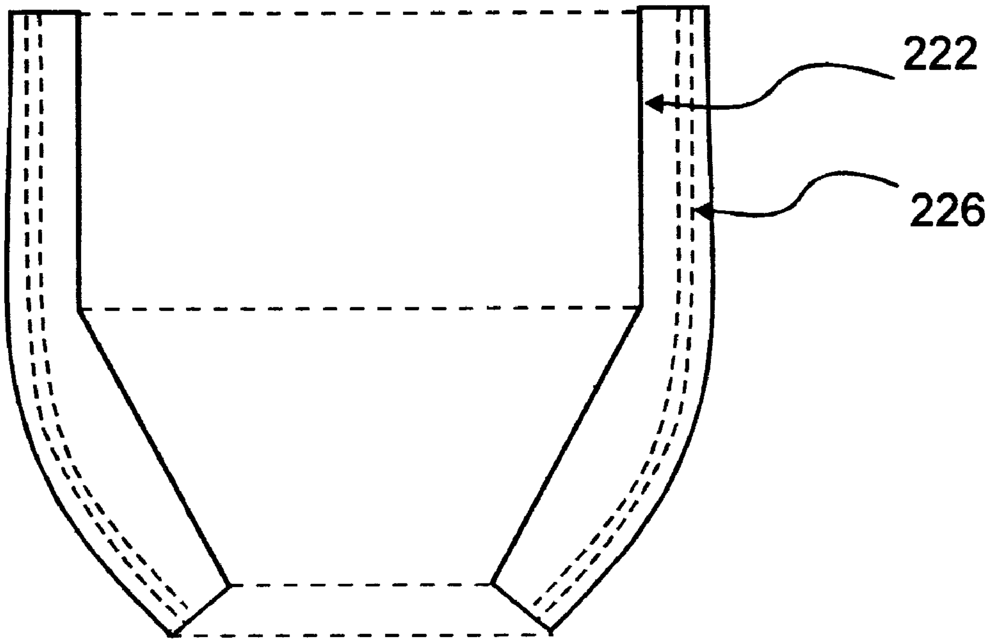
FIGS. 4 and 5 show a sectional view and top plan view respectively of a swirl for the plasma torch head of FIG. 2.
Figure 5:
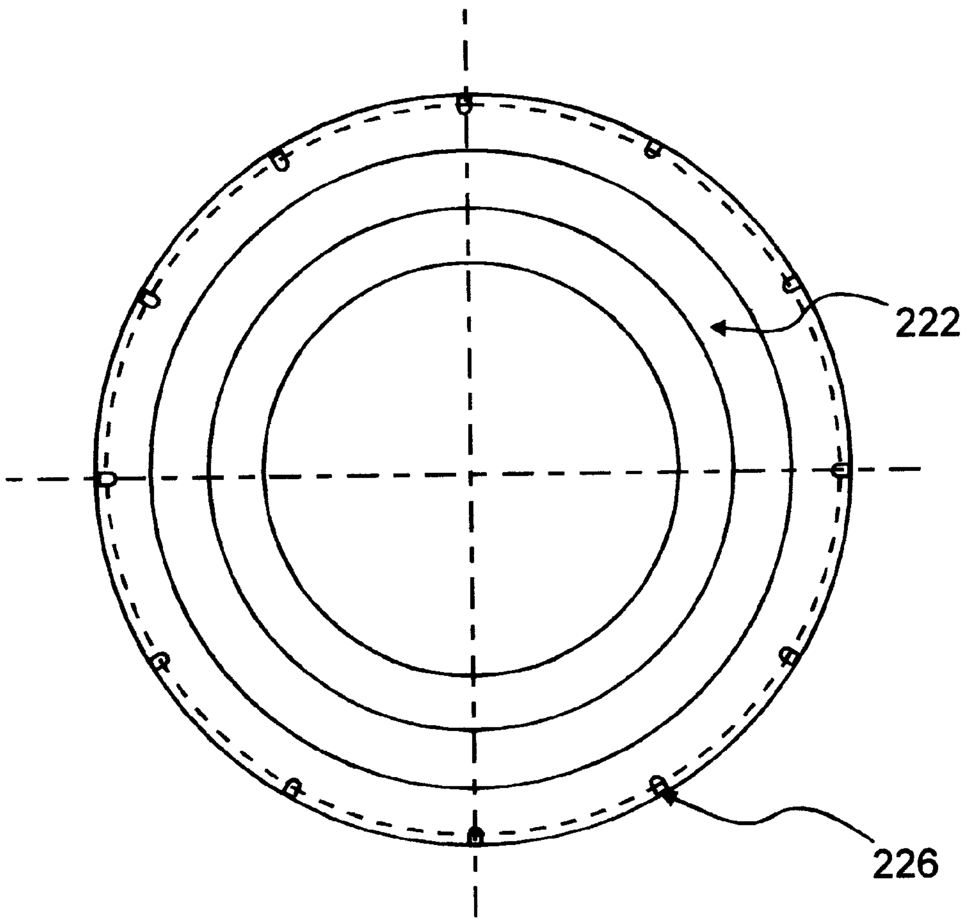

The swirl 222 is unique to this invention. The tangential passages 126 of the head 100 of FIG. 1 are replaced by a plurality of spaced apart passages 226 machined, formed or drilled through the wall of the swirl 222 typically in the form of slots at an angle to the central axis of the swirl 222. The passages may define a spiral or hyperboloidal path as it descends operatively towards the nozzle orifice. The passages 226 transport plasma gases to the plasma arc formation area 228. The formations of the slots 226 are particularly seen in FIGS. 4 and 5. These passages 226 open into annular space 224 between the inner wall of the nozzle 212 and the outer surface of the electrode 216 at locations beyond the commencement circle 238 of the conical end 214. The vortex train travels a shorter distance relatively between the exit locations of the passages 226 and the plasma formation zone 228; therefore the kinetic energy imparted to the gas molecules is also conserved. Importantly, the vortices avoid the change of direction in the conical end 214 of the nozzle 212 because the gas traverses through the passages 226 before it is constituted into vortices. As seen in the alternative embodiments the conical 214 may be flat or curvaceous, the curvaceous embodiment being preferred for greater avoidance of turbulence and specifically a path that defines a hyperboloid as it descends. Turbulence of the vortices as a result of this traverse found in the head 100 is therefore eliminated.

This ensures that the point of attachment of the arc at the approximate center of the flat surface of the electrode 216 at the emissive insert 250 is not disturbed and the turbulence which would have otherwise deviated the arc through the nozzle throat 220 is also attenuated. The jet of gas impinges on the molten material with greater kinetic energy resulting in a more efficient removal of molten material from the work piece 234.

The cutting speed for a quality cut at 12 mm. thick mild steel is 2.5 meters per minute even using a simple transformer—rectifier type power source. The cut finish is also improved.

Finer cut accuracy, reduced cut taper, higher cutting speeds and extended life of consumables are therefore achievable with the use of the head 200 of this invention.

What is claimed is:

1. A method of centering an electrode in the nozzle of a plasma arc torch head consisting of an electrode with an operative front tapered end, a nozzle having an operative front tapered end and a swirl, comprising the steps of:

complementing the external wall of the swirl to the internal taper of the nozzle;

complementing the internal wall of the swirl to the external taper of the electrode;

fitting the hollow tapered swirl so formed in the hollow nozzle to abut the inner taper of the nozzle; and fitting the electrode in the hollow swirl to abut the inner taper of the swirl to center the electrode within the nozzle yet spacing the front end surface of the electrode from the nozzle orifice.

2. A head for a plasma arc torch consisting of an electrode, a tapered nozzle and a swirl in which the swirl is defined by a hollow body of insulated, high temperature resistant material with a conical end, the outer wall of the swirl body being complementary to inner wall of the conical end of the nozzle; the inner wall of the swirl body being complementary to the outer wall of the side walls of the conical end of the electrode and the electrode is fitted in the swirl so that the conical tapered end of the electrode and the inner tapered wall of the swirl abut each other and the tapered outer wail of the swirl and the tapered inner wall of the conical end of the nozzle abut each other so that the electrode is centered with reference to the nozzle orifice.

3. A head for a plasma arc cutting torch comprising:

a cone ended peripheral nozzle, consisting of a cylindrical body with a cone end extending from the body, defining a nozzle orifice and nozzle throat;

an electrode removable fitted axially within the nozzle having an operative front end defining an end surface bearing an emissive insert;

a plasma formation zone or plenum formed between the end surface of the electrode and the nozzle orifice;

a swirl located between the nozzle and the electrode, through which plasma fuel gas is introduced into the nozzle, characterized in that the plasma fuel gas is introduced directly into the plasma formation zone or plenum beyond the junction between the nozzle body and cone end thereby avoiding change in direction within the conical end of the nozzle before the plasma formation zone.

4. A head for a plasma arc cutting torch as claimed in claim 3, in which a plurality of passages are defined at an angle to the axis of the swirl through the swirl wall, the said passages opening into the annular space between the electrode and the inner wall of the nozzle in the conical end region of the nozzle.

5. A head for a plasma arc cutting torch as claimed in claim 3, in which the passages are in the form of a plurality of slots formed in the swirl wall, the said slots being axially spaced apart and angled to lead plasma fuel gas to the plasma formation zone.

* * * * *